US009777869B2

(12) United States Patent
Kamimura et al.

(10) Patent No.: US 9,777,869 B2
(45) Date of Patent: Oct. 3, 2017

(54) FEMALE COUPLING MEMBER SUITABLE FOR HANDLING HIGH-PRESSURE FLUID AND PIPE COUPLING HAVING FEMALE COUPLING MEMBER (71) Applicant: NITTO KOHKI CO., LTD., Tokyo (JP)

(72) Inventors: Yoshito Kamimura, Tokyo (JP); Kazunori Aoki, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 135 days.

(21) Appl. No.: 14/744,830

(22) Filed: Jun. 19, 2015

(65) Prior Publication Data
US 2015/0377398 A1 Dec. 31, 2015

(30) Foreign Application Priority Data

Jun. 26, 2014 (JP) .................................. 2014-130854

(51) Int. Cl.
F16K 37/00 (2006.01)
F16L 37/084 (2006.01)
F16L 37/44 (2006.01)

(52) U.S. Cl.
CPC ...... F16K 37/0058 (2013.01); F16L 37/0848 (2013.01); F16L 37/44 (2013.01)

(58) Field of Classification Search
CPC .. F16K 37/0058; F16K 37/00; F16K 37/0008; F16K 37/0016; F16L 37/44; F16L 37/0848; F16L 37/00; F16L 37/0847; Y10T 137/87925; Y10T 137/87933; Y10T 137/87941; Y10T 137/87949; Y10T 137/87957; Y10T 137/87965;
(Continued)

(56) References Cited

U.S. PATENT DOCUMENTS 4,331,177 A * 5/1982 Makishima ......... F16L 37/0841
137/556
6,006,784 A * 12/1999 Tsutsui .................. E03C 1/0403
137/359

(Continued)

FOREIGN PATENT DOCUMENTS

JP 2003-113981 A 4/2003
JP 2010-054041 A 3/2010

OTHER PUBLICATIONS

Office Action received in Japanese Application No. 2015-121694 dated Aug. 17, 2017.

Primary Examiner — Michael R Reid
(74) Attorney, Agent, or Firm — Brinks Gilson & Lione (57) ABSTRACT Disclosed is a female coupling member which includes a housing having a fluid passage extending therethrough, a valve member selectively opening and closing the fluid passage, and a valve open-closed state indicating member. The valve open-closed state indicating member has a valve open state indicating part and a valve closed state indicating part and is displaced in response to the displacement of the valve member. When a male coupling member is connected to the female coupling member, and when the valve member is in an open position, the valve open state indicating part is visible from the outside of the housing through a window of the housing, whereas, when the valve member is in a closed position, the valve closed state indicating part is visible from the outside of the housing through the window.

16 Claims, 6 Drawing Sheets (58) Field of Classification Search
CPC ....... Y10T 137/87973; Y10T 137/8225; Y10T 137/8275; Y10T 137/8158
USPC .................. 137/614–614.06, 551, 553, 556; 251/149, 149.1, 149.9; 116/277
See application file for complete search history.

(56) References Cited

U.S. PATENT DOCUMENTS

| | | | |
|---|---|---|---|
| 6,557,824 B1* | 5/2003 | Jenski, Jr. ............... | F16L 37/23 137/614.03 |
| 8,186,649 B2 | 5/2012 | Aoki | |
| 8,251,346 B2* | 8/2012 | Stroup .............. | A61M 5/16881 251/149.5 |
| 2007/0235092 A1* | 10/2007 | Danielson ............... | F16L 37/23 137/614 |
| 2010/0284732 A1 | 11/2010 | Nakamura | |
| 2011/0037254 A1 | 2/2011 | Aoki | |

* cited by examiner

FEMALE COUPLING MEMBER SUITABLE FOR HANDLING HIGH-PRESSURE FLUID AND PIPE COUPLING HAVING FEMALE COUPLING MEMBER

BACKGROUND OF THE INVENTION

1. Field of the Invention

The present invention relates to pipe couplings. More particularly, the present invention relates to a female coupling member suitable for handling high-pressure fluid, e.g. hydrogen gas, and also relates to a pipe coupling having the female coupling member.

2. Description of Related Art

Vehicles equipped with a fuel cell using hydrogen gas as a power source have been put to practical use. Such fuel cell vehicles need to be supplied with hydrogen gas at a hydrogen gas supply station similar to a gasoline filling station for general gasoline engine vehicles. In this case, a female coupling member attached to the outlet of a hose for discharging and supplying hydrogen gas from a hydrogen gas storage tank at the hydrogen gas supply station is connected to a male coupling member attached to the inlet of a hydrogen gas storage tank in the vehicle, thereby supplying hydrogen gas to the vehicle.

Hydrogen gas supplied from the hydrogen gas storage tank to the vehicle is generally at a pressure of the order of 70 MPa. Therefore, all possible measures need to be taken to prevent the occurrence of an accident such as leakage of hydrogen from the pipe coupling comprising the male and female coupling members. US2011/0037254A1 and U.S. Pat. No. 8,186,649B2 disclose a female coupling member that is allowed to connect with a male coupling member only when the female coupling member is not in fluid communication with a hydrogen gas source, and that is allowed to pass high-pressure hydrogen gas only when the male coupling member is completely connected to the female coupling member. Further, the female coupling member is configured to prevent accidental disconnection of the male coupling member from the female coupling member by the operator when hydrogen gas is being supplied with the associated valve member placed in an open position.

SUMMARY OF THE INVENTION

With the above-described female coupling member, however, the operator cannot know from the appearance of the pipe coupling whether or not hydrogen gas is being supplied.

The present invention has been made in view of the above-described circumstances, and it is an object of the present invention to provide a female coupling member allowing the user to handle a high-pressure fluid even more safely. Another object of the present invention is to provide a pipe coupling having the female coupling member of the present invention.

A female coupling member according to an embodiment of the present invention includes a tubular housing, a valve member, and a valve open-closed state indicating member. The housing has one end to which a male coupling member is connectable, and an other end connectable to a fluid supply pipe extending from a fluid source. The housing has a fluid passage communicating between the male coupling member connected to the one end and the fluid supply pipe connected to the other end. The valve member is displaceable between an open position where the valve member opens the fluid passage and a closed position where the valve member closes the fluid passage. The valve open-closed state indicating member has a valve open state indicating part and a valve closed state indicating part. The valve open-closed state indicating member is provided in the housing and displaced in response to the displacement of the valve member such that, when the valve member is in the open position, the valve open state indicating part is visible from the outside of the housing, whereas, when the valve member is in the closed position, the valve closed state indicating part is visible from the outside of the housing.

Specifically, the housing may have a first window. The valve open-closed state indicating member may be displaced such that, when the valve member is in the open position, the valve open state indicating part is radially aligned with the first window, thereby allowing the valve open state indicating part to be visible from the outside through the first window, whereas, when the valve member is in the closed position, the valve closed state indicating part is radially aligned with the first window, thereby allowing the valve closed state indicating part to be visible from the outside through the first window.

The female coupling member may further include a first locking member, a retaining member, and a holding member. The first locking member is attached to the housing. The first locking member is displaceable between a locking position where the first locking member engages the male coupling member inserted into the housing from the one end thereof to connect the male coupling member to the female coupling member and an unlocking position where the first locking member is disengaged from the male coupling member to cancel connection of the male coupling member to the female coupling member. The retaining member is displaceable between a retaining position where the retaining member retains the first locking member in the unlocking position and a displacement allowing position where the retaining member allows the first locking member to be displaced to the locking position by the male coupling member inserted into the housing. The holding member is attached to the housing. The holding member is displaceable between a standby position where the holding member allows the first locking member to assume the unlocking position and a holding position where the holding member holds the first locking member in the locking position. The holding member is configured to cover the first window from the outside when the holding member is in the standby position, thereby making the first window invisible from the outside of the housing.

In this case, the holding member may have an outer member displaceable over the outer peripheral surface of the housing and an inner member provided inside the housing and integrally connected to the outer member. The holding member may be configured such that, when the holding member is in the standby position, the outer member is positioned to cover the first window from the outside and the inner member is positioned to allow the first locking member is displaced to the unlocking position, and when the holding member in the holding position, the outer member is positioned to expose the first window to the outside and the inner member is positioned to engage the first locking member to hold the first locking member in the locking position. The outer member and the inner member may be tubular members.

The housing may have on the outer peripheral surface thereof a coupled state indicating part and an uncoupled state indicating part which are spaced from each other in the longitudinal direction of the housing. The outer member of the holding member may have a second window configured such that, when the holding member is in the standby position, the second window aligns with the uncoupled state indicating part in the radial direction of the housing, thereby allowing the uncoupled state indicating part to be visible from the outside of the female coupling member through the second window, whereas, when the holding member is in the holding position, the second window aligns with the coupled state indicating part in the radial direction of the housing, thereby allowing the coupled state indicating part to be visible from the outside through the second window.

The valve member may have a movable valve seat member and a valve element which are provided in the fluid passage so as to be displaceable in the longitudinal direction of the fluid passage. The valve member may be configured such that the valve element closes the fluid passage by engaging a valve seat portion of the movable valve seat member, and that the valve element is disengaged from the valve seat portion to open the fluid passage by displacement of the movable valve seat member relative to the valve element. The valve open-closed state indicating member may be configured to be displaced in response to the displacement of the movable valve seat member in the longitudinal direction.

The female coupling member may further include an arresting member provided at a position closer to the one end of the housing than the valve member in alignment with the valve member in the longitudinal direction of the fluid passage. The arresting member is displaceable in the longitudinal direction of the fluid passage. The arresting member is configured to be displaced toward the valve member to reach an arresting position by the male coupling member inserted into and connected to the female coupling member. The movable valve seat member and the valve element may be configured to be displaced toward the one end of the housing by the fluid pressure of a pressurized fluid supplied through the fluid supply pipe connected to the other end of the housing, so that the arresting member, which is in the arresting position at this time, engages the valve element to stop displacement of the valve element, while allowing the movable valve seat member to be displaced relative to the valve element that has stopped, thereby opening the fluid passage.

The female coupling member may further include a second locking member provided between the valve member and the holding member. The second locking member is configured such that, when a pressurized fluid is supplied from the fluid supply pipe in a state where the holding member is in the standby position, the second locking member is pressed and displaced by the valve member displaced toward the open position by the pressurized fluid, but the second locking member is stopped from being displaced by engaging the holding member before the valve member reaches the open position, thereby blocking the valve member from reaching the open position and also blocking the holding member from being displaced to the holding position, whereas, when the pressurized fluid is supplied from the fluid supply pipe in a state where the holding member is in the holding position, the second locking member does not engage the holding member, thereby allowing the valve member to be displaced to the open position.

The female coupling member may further include a transmission-reception terminal for transmitting and receiving infrared rays provided at an end surface at the one end of the housing, and a signal line extending from the transmission-reception terminal to the other end of the housing.

In addition, the present invention provides a pipe coupling including the above-described female coupling member, and a male coupling member connected to the female coupling member by being inserted from the one end of the female coupling member.

Embodiments of a pipe coupling suitable for handling a high-pressure fluid even more safely according to the present invention will be explained below based on the accompanying drawings.

DETAILED DESCRIPTION OF PREFERRED EMBODIMENT

Figure 2:
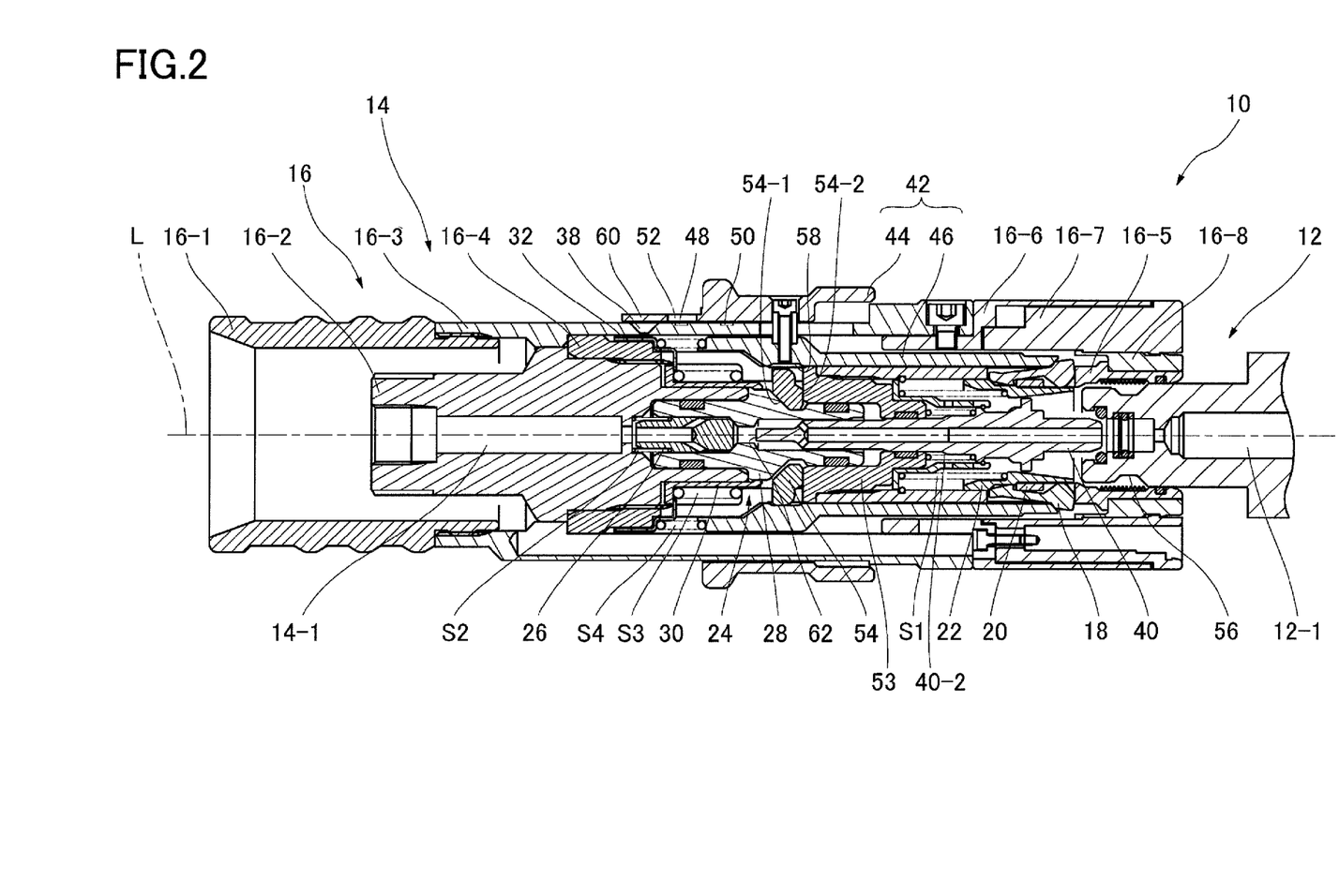
FIG. 2 is a longitudinal sectional view similar to FIG. 1, showing the female coupling member when a male coupling member has begun to be inserted into the female coupling member in a state where the female coupling member is out of fluid communication with the high-pressure fluid source.
Figure 3:
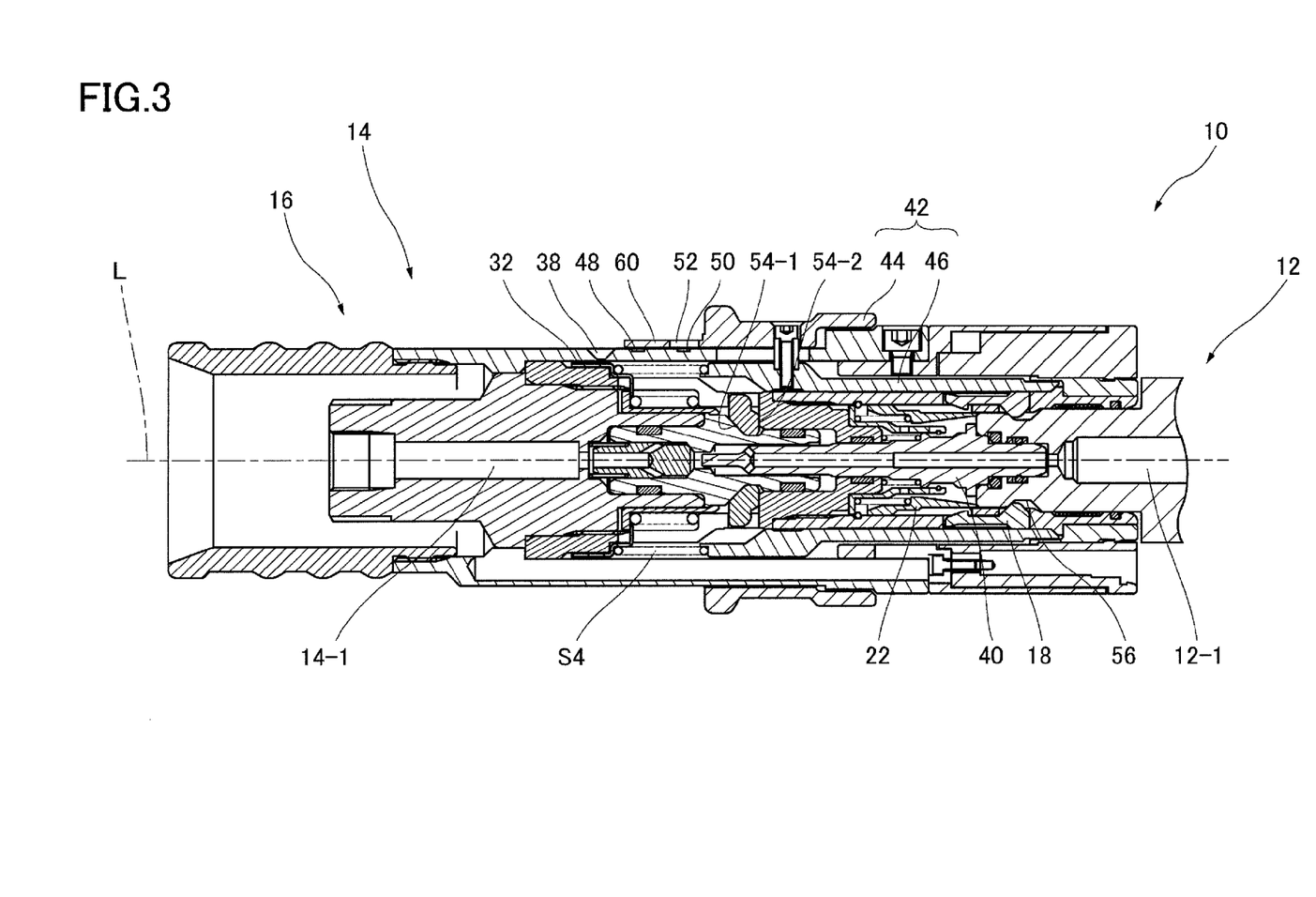
FIG. 3 is a longitudinal sectional view of the female coupling member when connection with the male coupling member has been completed by further inserting the male coupling member from the position shown in FIG. 2.
Figure 4:
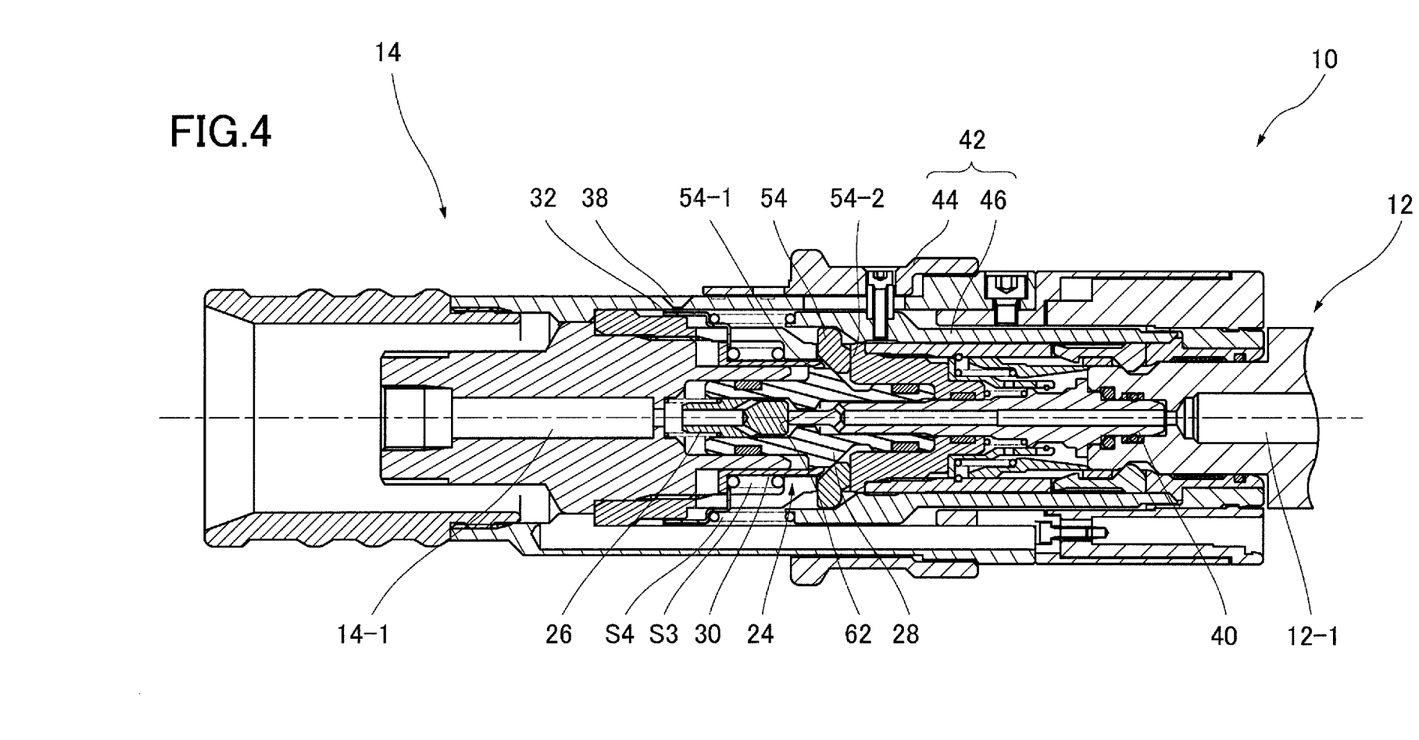
FIG. 4 is a longitudinal sectional view of the female coupling member when brought into fluid communication with the high-pressure fluid source after the completion of connection with the male coupling member.

A pipe coupling 10 according to an embodiment of the present invention comprises a male coupling member 12 and a female coupling member 14 as shown in FIGS. 2 to 4.

The female coupling member 14 has, as shown in FIGS. 1 to 4, a tubular housing 16 having an end (right end in FIG. 1) adapted to receive and connect with the male coupling member 12 and the other end (left end in FIG. 1) adapted to be connected to a fluid supply pipe extending from a high-pressure fluid source (not shown) at a hydrogen gas supply station or the like. The housing 16 comprises a multiplicity of components 16-1 to 16-8 combined together by thread connection or the like and has a fluid passage 14-1 formed therein to extend along a center axis L.

A collet chuck type first locking member 18 is provided near the right end of the housing 16. The first locking member 18 is pivotably supported by a tubular fulcrum member 20 provided inside the first locking member 18. That is, the first locking member 18 is pivotable about the fulcrum member 20 to move between a locking position (FIGS. 3 and 4) where the first locking member 18 engages the male coupling member 12 inserted into the housing 16 from the right end thereof to connect the male coupling member 12 to the female coupling member 14 and an unlocking position (FIGS. 1 and 2) where the first locking member 18 is disengaged from the male coupling member 12 to cancel the connection between the female coupling member 14 and the male coupling member 12.

The housing 16 has a tubular retaining member 22 inside the first locking member 18 and the fulcrum member 20. The retaining member 22 is displaceable between a retaining position (FIGS. 1 and 2) where the retaining member 22 retains the first locking member 18 in the unlocking position and a displacement allowing position (FIGS. 3 and 4) where the retaining member 22 is pushed in by the male coupling member 12 inserted into the housing 16, thereby allowing the first locking member 18 to be displaced to the locking position. The retaining member 22 is urged toward the retaining position from the displacement allowing position by a first coil spring S1, while being prevented from coming out of the housing 16 by engagement of the outer peripheral surface of the retaining member 22 with the fulcrum member 20.

The housing 16 is provided therein with a valve member 24. The valve member 24 is displaceable between three positions: a closed position (FIG. 1) assumed when the male coupling member 12 is not connected to the female coupling member 14 and high-pressure fluid is being applied to the valve member 24; another closed position (FIGS. 2 and 3) assumed when the high-pressure fluid is not applied to the valve member 24 in order for the male coupling member 12 to be inserted into and connected to the female coupling member 14; and an open position (FIG. 4) assumed when the high-pressure fluid is applied to the valve member 24 after the male coupling member 12 has been connected to the female coupling member 14.

Specifically, the valve member 24 comprises a valve element 26 and a movable valve seat member 28 which are displaceable in the direction of the center axis L of the housing 16. The valve element 26 has a valve head portion 26-1, a tubular portion 26-2, and a flow path 26-3 obliquely extending through a part of the valve element 26 between the tubular portion 26-2 and the valve head portion 26-1 from the inner bore of the tubular portion 26-2. The valve element 26 is urged rightward (as seen in the figures) by a second coil spring S2. The movable valve seat member 28 has a through-bore 28-1 aligned with the fluid passage 14-1 of the housing 16 in the direction of the center axis L. The through-bore 28-1 has the valve element 26 slidably received therein. The movable valve seat member 28 is urged leftward (as seen in the figures) by a tubular connecting member 30 engaged with the movable valve seat member 28 and urged leftward by a third coil spring S3. The third coil spring S3 is greater in spring force than the second coil spring S2. When no high-pressure fluid is supplied into the fluid passage 14-1, the third coil spring S3 causes the movable valve seat member 28 to be displaced, together with the valve element 26, to a leftward position shown in FIGS. 2 and 3, so that the valve head portion 26-1 of the valve element 26 sealingly engages a valve seat portion 28-2 of the movable valve seat member 28 to close the fluid passage.

Figure 5:
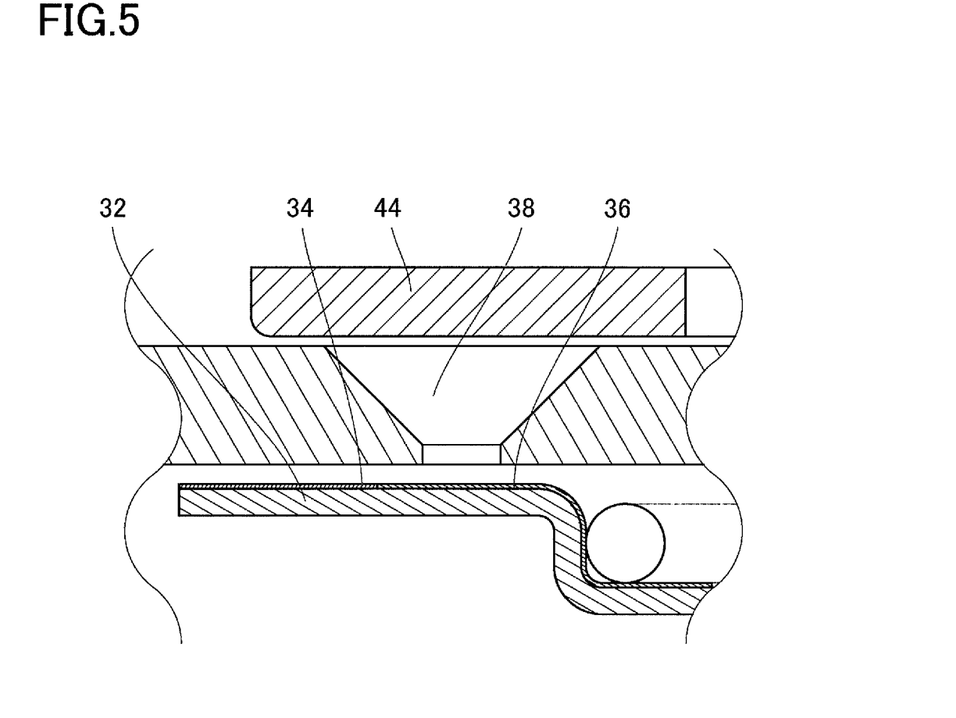
FIG. 5 is a fragmentary enlarged view showing a valve open-closed state indicating member and a first window when the female coupling member is in the position shown in FIG. 3.
Figure 6:
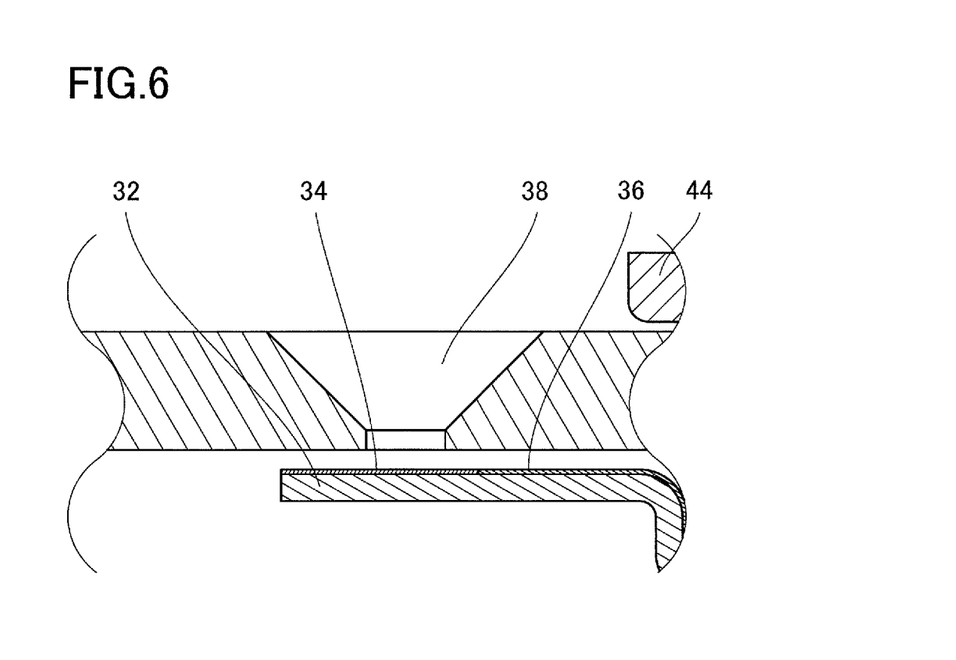
FIG. 6 is a fragmentary enlarged view showing the valve open-closed state indicating member and the first window when the female coupling member is in the position shown in FIG. 4.

The connecting member 30 has a tubular valve open-closed state indicating member 32 engaged with an end of the connecting member 30 opposite to the end of the same engaged with the movable valve seat member 28. The valve open-closed state indicating member 32 extends stepwise radially outward and is configured to be displaced in the direction of the center axis L in accordance with the displacement of the movable valve seat member 28. As shown in FIGS. 5 and 6, the valve open-closed state indicating member 32 is formed with a valve open state indicating part 34 and a valve closed state indicating part 36. The housing 16 is provided with a first window 38 for allowing the user to view the two indicating parts from the outside of the female coupling member 14. As will be described later, when the male coupling member 12 is connected to the female coupling member 14, as shown in FIGS. 3 and 4, the first window 38 is exposed to the outside of the female coupling member 14. When the movable valve seat member 28 is in the open position of the valve member 24, as shown in FIG. 4, the valve open state indicating part 34 is visible from the outside of the female coupling member 14 through the first window 38. When the movable valve seat member 28 is in the closed position of the valve member 24, as shown in FIG. 3, the valve closed state indicating part 36 is visible from the outside of the female coupling member 14 through the first window 38. It should be noted that, in this embodiment, the valve open state indicating part 34 is painted red, while the valve closed state indicating part 36 is painted blue, thereby allowing the user to visually recognize whether the valve member 24 is open or closed at a glance.

Between the right end of the housing 16 and the valve element 26 is provided an elongated tubular arresting member 40 extending along the center axis L and spring-urged rightward. The arresting member 40 is pushed in by the male coupling member 12 inserted into the female coupling member 14. The arresting member 40 has a bore 40-1 extending along the center axis L and branching out near the left end thereof to open on the side surface of the arresting member 40. The bore 40-1 constitutes a part of the fluid passage 14-1.

The housing 16 is further provided with a tubular holding member 42. The holding member 42 comprises an outer tubular member 44 slidable over the outer peripheral surface of the housing 16 and an inner tubular member 46 provided inside the housing 16 and integrally connected to the outer tubular member 44 by a screw 45. The holding member 42 is displaceable between a standby position (FIGS. 1 and 2) where the holding member 42 allows the first locking member 18 to assume the unlocking position and a holding position (FIGS. 3 and 4) where the holding member 42 holds the first locking member 18 in the locking position. The holding member 42 is urged toward the holding position from the standby position by a fourth coil spring S4 as an urging member. When the first locking member 18 is in the unlocking position, the holding member 42 is held in the standby position by the first locking member 18. When the first locking member 18 is in the locking position, the holding member 42 is displaced to the holding position by the fourth coil spring S4.

The outer tubular member 44 of the holding member 42 is provided with a second window 52. When the holding member 42 is in the standby position (FIGS. 1 and 2), the second window 52 radially aligns with an uncoupled state indicating part 48 formed on the outer surface of the housing 16. When the holding member 42 is in the holding position (FIGS. 3 and 4), the second window 52 radially aligns with a coupled state indicating part 50 formed on the outer surface of the housing 16. Thus, the user can view these indicating parts from the outside of the female coupling member 14. It should be noted that, in this embodiment, the uncoupled state indicating part 48 is marked with the letters "OPEN", and the coupled state indicating part 50 is marked with the letters "SHUT", thereby allowing the user to recognize whether or not the male coupling member 12 and the female coupling member 14 are connected to each other at a glance.

Three or four circumferentially spaced and radially displaceable second locking members 54 are provided between the movable valve seat member 28 and a stationary tubular member 53 constituting the housing 16. The second locking members 54 each have a cross-section as shown in the figures and have a left inclined surface 54-1 slidably engageable with a conic surface 28-3 of the movable valve seat member 28 and a right side surface 54-2 slidably engageable with the stationary tubular member 53 and extending perpendicularly to the center axis L.

Appropriate seal means is provided in gaps extending between the fluid passage 14-1 and the outside of the female coupling member 14 to prevent the fluid from flowing out from the fluid passage.

As shown in FIG. 2, the male coupling member 12 is configured, as has been stated above, such that, by being inserted into the female coupling member 14, the male coupling member 12 pushes in the retaining member 22 to the displacement allowing position (FIGS. 3 and 4) and, at the same time, pushes in the arresting member 40. The male coupling member 12 has an annular recess 56 formed on the outer peripheral surface thereof. The annular recess 56 is engageable with the first locking member 18.

In the above, we have generally explained the structures of the female coupling member 14 and the male coupling member 12. In the following, we will explain in detail the movements of the components of the pipe coupling associated with the supply of high-pressure fluid and with the connection between the male coupling member 12 and the female coupling member 14.

Figure 1:
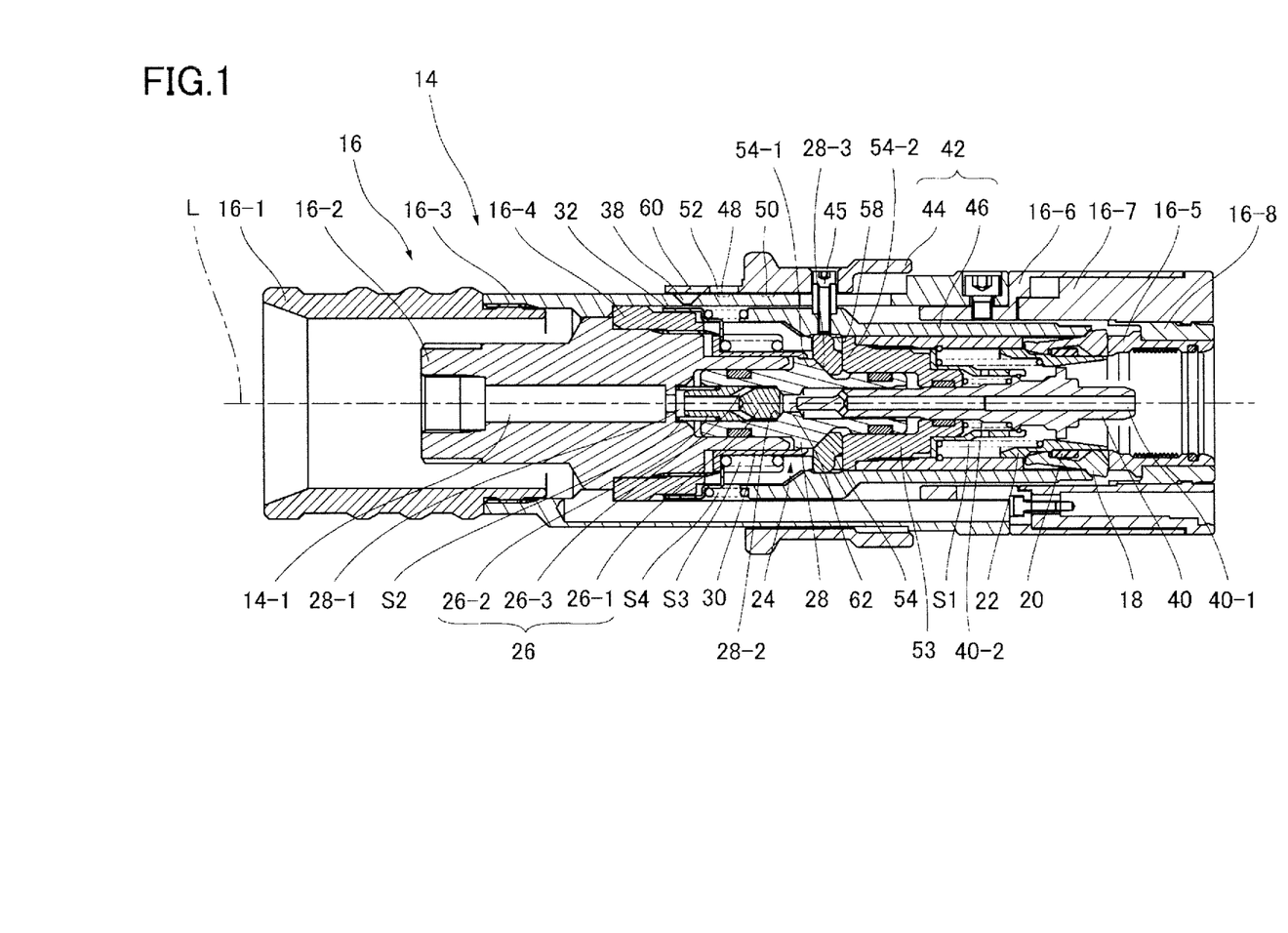
FIG. 1 is a longitudinal sectional view of a female coupling member according to an embodiment of the present invention, showing a state where a male coupling member is not connected to the female coupling member, and where the female coupling member is in fluid communication with a high-pressure fluid source (not shown) and hence subjected to high fluid pressure.

As shown in FIG. 1, when the female coupling member 14 is being supplied with high-pressure fluid from the fluid source in a state where the male coupling member 12 is not connected to the female coupling member 14, the valve element 26 and the movable valve seat member 28 are displaced rightward as seen in the figure by the fluid pressure of the high-pressure fluid against the spring forces of the third and fourth coil springs S3 and S4. Accordingly, the second locking members 54 between the movable valve seat member 28 and the stationary tubular member 53 are displaced radially outward but stopped from being displaced by engagement with a recess 58 formed on the inner tubular member 46 of the holding member 42. Consequently, the rightward displacement of the movable valve seat member 28 is stopped, and the valve head portion 26-1 of the valve element 26 is sealingly engaged with the valve seat portion 28-2 of the movable valve seat member 28 by the spring force of the third coil spring S3, and thus the fluid passage 14-1 is kept closed. When the male coupling member 12 is inserted into the female coupling member 14 in this state, the retaining member 22 is pushed in to the displacement allowing position, but the holding member 42 is not displaced to the holding position but held in the standby position because the second locking members 54 are in engagement with the recess 58 formed on the inner tubular member 46 of the holding member 42. Accordingly, when the high-pressure fluid is being supplied to the female coupling member 14, the male coupling member 12 and the female coupling member 14 will never be locked to each other by the first locking member 18. In addition, even when the male coupling member 12 is inserted into the female coupling member 14 to push in the arresting member 40, the arresting member 40 will not be pushed in to such an extent that the left end of the arresting member 40 engages the valve element 26, because a step 40-2 formed on the arresting member 40 engages the stationary tubular member 53. Accordingly, the fluid passage 14-1 cannot be opened.

As shown in FIGS. 1 and 2, when the male coupling member 12 is not connected to the female coupling member 14 by the first locking member 18, the holding member 42 is in the standby position, and a rear end portion 60 of the outer tubular member 44 covers the first window 38 to disable the user from viewing the valve open-closed state indicating member 32 from the outside. At this time, the second window 52 radially aligns with the uncoupled state indicating part 48 to enable the user to view the uncoupled state indicating part 48. That is, the user can confirm that the male coupling member 12 and the female coupling member 14 are not connected to each other by viewing the uncoupled state indicating part 48 through the second window 52.

When the male coupling member 12 is to be connected to the female coupling member 14, the supply of high-pressure fluid to the female coupling member 14 is cut off to stop the application of high fluid pressure to the valve member 24. This state is shown in FIG. 2. That is, because the valve member 24 is not subjected to such high fluid pressure as in FIG. 1, the valve member 24 is displaced leftward of the position shown in FIG. 1 by the actions of the third and fourth coil springs S3 and S4. Consequently, the upper second locking members 54 are displaced radially inward by gravity to disengage from the recess 58 of the holding member 42, as shown in FIG. 2. In this state, the male coupling member 12 is inserted to the position shown in FIG. 3. Consequently, the retaining member 22 is pushed in to the displacement allowing position, and in association with this, the holding member 42 is displaced by the fourth coil spring S4 from the standby position shown in FIG. 2 to the holding position shown in FIG. 3, so that the first locking member 18 is placed in the locking position to engage the annular recess 56 of the male coupling member 12. At this time, the lower second locking members 54, which have been engaged with the recess 58, are pushed out of the recess 58 radially outward by the left inclined side surface of the recess 58. Accordingly, the second locking members 54 do not constitute an obstacle to the rightward displacement of the holding member 42. The arresting member 40 is also pushed in by the male coupling member 12 and thus displaced leftward in the direction of the center axis L.

As the holding member 42 is displaced, the first window 38, which was covered with the rear end portion 60 of the holding member 42, is exposed, thereby allowing the user to view the valve closed state indicating part 36 (FIGS. 5 and 6) through the first window 38. In addition, it becomes possible for the user to view the coupled state indicating part 50 through the second window 52. At this time, the uncoupled state indicating part 48 is covered with the rear end portion 60 and therefore invisible to the user.

The above completes the process of connecting together the male coupling member 12 and the female coupling member 14. At this time, the user can view the coupled state indicating part 50 through the second window 52 and therefore can confirm that the male coupling member 12 and the female coupling member 14 are connected to each other. Further, the user can view the valve closed state indicating part 36 through the first window 38 and therefore can confirm that the fluid passage is closed.

When the supply of high-pressure fluid from the high-pressure fluid source to the female coupling member 14 is started after the completion of connection between the male coupling member 12 and the female coupling member 14, the valve member 24 is displaced rightward by the high fluid pressure applied thereto, but the valve element 26 is arrested from being displaced rightward by engagement with the left end of the arresting member 40. In this state, the movable valve seat member 28 is further displaced rightward, which causes the valve head portion 26-1 of the valve element 26 to separate from the valve seat portion 28-2 of the movable valve seat member 28, thereby allowing the high-pressure fluid to flow into a fluid passage 12-1 in the male coupling member 12 through the fluid passage 14-1.

Thus, the valve member 24 is displaced rightward by the fluid pressure, and the second locking members 54, which are in engagement with the movable valve seat member 28, are displaced from the first position shown in FIG. 3 to the second position shown in FIG. 4 to block displacement of the holding member 42 from the holding position to the standby position. The displacement of the movable valve seat member 28 causes the valve open-closed state indicating member 32 to be displaced rightward through the connecting member 30, thereby allowing the user to view the valve open state indicating part 34 through the first window 38. In addition, when the high-pressure fluid is being supplied to the female coupling member 14, the male coupling member 12 and the female coupling member 14 cannot be disconnected from each other because the holding member 42 is blocked from being displaced to the standby position by the second locking members 54, as has been stated above.

Figure 7:
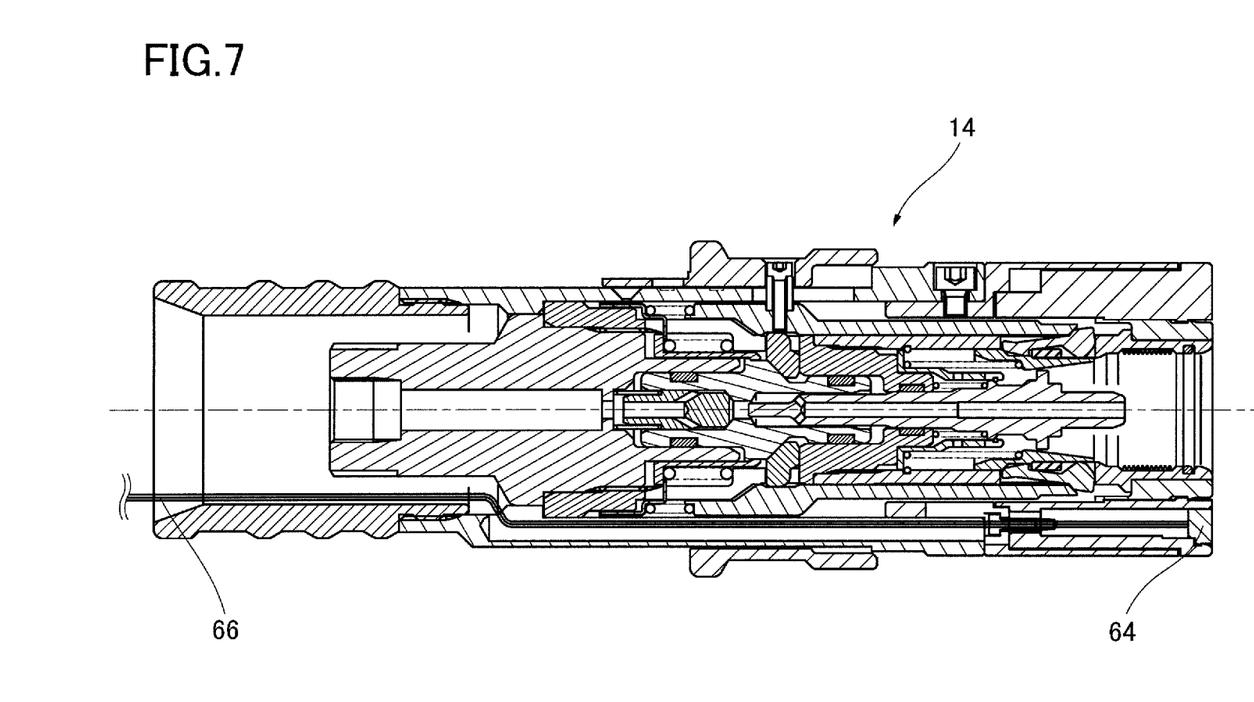
FIG. 7 is a longitudinal sectional view of a female coupling member according to a modification of the embodiment of the present invention.

FIG. 7 shows a modification in which the above-described female coupling member 14 is equipped with a transmission-reception terminal 64 for infrared communication. More specifically, the female coupling member 14 has a terminal 64 for transmitting and receiving infrared rays buried in an end surface thereof on the side to which the male coupling member 12 is to be connected, and a signal line 66 is provided to extend from the terminal 64 toward the high-pressure fluid source through the housing 16. A similar transmission-reception terminal (not shown) is attached to the end surface of the male coupling member to exchange information between the female coupling member and the male coupling member, thereby making it possible to add required functions based on the exchanged information. For example, the arrangement may be as follows. When a female coupling member at a hydrogen gas supply station is connected to a male coupling member of a fuel cell vehicle to supply hydrogen into a hydrogen tank of the fuel cell vehicle, the female coupling member-side terminal receives information about the amount of hydrogen stored in the hydrogen tank to stop the supply of hydrogen when the amount of hydrogen supplied reaches a predetermined level. It is also possible to stop the supply of hydrogen when the female coupling member-side terminal receives information about a problem on the hydrogen tank side.

Although some embodiments of the present invention have been described above, the present invention is not limited to the foregoing embodiments. For example, although the valve open state indicating part 34 and the valve closed state indicating part 36 are painted red and blue, respectively, so as to be distinguished from each other, various methods may be used to make a distinction therebetween. For example, letters may be used in place of colors for distinction. Further, although the uncoupled state indicating part 48 and the coupled state indicating part 50 are distinguished from each other by being marked with "OPEN" and "SHUT", respectively, various methods may be used to make a distinction therebetween. For example, colors may be used in place of letters for distinction. The first window 38 and the second window 52 may be covered with a transparent member formed of an acrylic resin material or the like. Alternatively, the first and second windows 38 and 52 may be merely openings.

What is claimed is:

1. A female coupling member comprising:
   a tubular housing having one end for connecting to a male coupling member, and another end for connecting to a fluid supply pipe extending from a fluid source, the tubular housing having a fluid passage for communicating between the male coupling member connected to the one end and the fluid supply pipe when connected to the other end, wherein the housing has a first window for viewing;
   a valve member displaceable between an open position where the valve member opens the fluid passage and a closed position where the valve member closes the fluid passage;
   a valve open-closed state indicating member having a valve open state indicating part and a valve closed state indicating part, the valve open-closed state indicating member being provided in the housing and displaced in response to displacement of the valve member such that, when the valve member is in the open position, the valve open state indicating part aligns with the first window in a radial direction of the housing, thereby allowing the valve open state indicating part to be viewable through the first window from outside of the housing, while the valve closed state indicating part is covered by the housing and not viewable from the outside of the housing, whereas, when the valve member is in the closed position, the valve closed state indicating part aligns with the first window in the radial direction of the housing, thereby allowing the valve closed state indicating part to be viewable through the first window from the outside of the housing, while the valve open state indicating part is covered by the housing and not viewable from the outside of the housing; and
   a first locking member attached to the housing, wherein the first locking member being displaceable between a locking position and an unlocking position,
      when in the locking position, the first locking member is configured to engage the male coupling member when being inserted into the housing from the one end thereof for connecting the male coupling member to the female coupling member, and
      when in the unlocking position, the first locking member is configured to be disengaged from the male coupling member for disconnecting the male coupling member from the female coupling member;
   a retaining member being displaceable between a retaining position and a displacement allowing position, wherein when in the retaining position, the retaining member retains the first locking member in the unlocking position, and when in the displacement allowing position, the retaining member allows the first locking member to be displaced to the locking position, wherein the retaining member is configured to be displaced by the male coupling member from the retaining position to the displacement allowing position in case the male coupling member is being inserted into the housing; and
   a holding member attached to the housing, the holding member being displaceable between a standby position and a holding position, wherein when in the standby position, the holding member allows the first locking member to assume the unlocking position and wherein when in the holding position, the holding member holds the first locking member in the locking position, wherein the holding member being configured to cover the first window from an outside when the holding member is in the standby position, thereby making the first window not viewable from the outside of the housing.

2. The female coupling member of claim 1, wherein the holding member has an outer member displaceable on an outer peripheral surface of the housing and an inner member provided inside the housing and integrally connected to the outer member, and wherein, when the holding member is in the standby position, the outer member is positioned to cover the first window from the outside and the inner member is positioned to allow the first locking member to be displaced to the unlocking position, and when the holding member is in the holding position, the outer member is positioned to expose the first window to the outside and the inner member is positioned to engage the first locking member to hold the first locking member in the locking position.

3. The female coupling member of claim 2, wherein the outer member and the inner member are tubular members.

4. The female coupling member of claim 2, wherein the housing has on the outer peripheral surface thereof a coupled state indicating part and an uncoupled state indicating part which are spaced from each other in a longitudinal direction of the housing;

the outer member of the holding member having a second window configured such that, when the holding member is in the standby position, the second window aligns with the uncoupled state indicating part in the radial direction of the housing, thereby allowing the uncoupled state indicating part to be visible from the outside of the female coupling member through the second window, whereas, when the holding member is in the holding position, the second window aligns with the coupled state indicating part in the radial direction of the housing, thereby allowing the coupled state indicating part to be visible from the outside through the second window.

5. The female coupling member of claim 1, further comprising:

a second locking member provided between the valve member and the holding member, the second locking member being configured such that, when a pressurized fluid is supplied from the fluid supply pipe in a state where the holding member is in the standby position, the second locking member is pressed and displaced by the valve member displaced toward the open position by the pressurized fluid, but the second locking member is stopped from being displaced by engaging the holding member before the valve member reaches the open position, thereby blocking the valve member from reaching the open position and also blocking the holding member from being displaced to the holding position, whereas, when the pressurized fluid is supplied from the fluid supply pipe in a state where the holding member is in the holding position, the second locking member does not engage the holding member, thereby allowing the valve member to be displaced to the open position.

6. The female coupling member of claim 1, further comprising:

a transmission-reception terminal for transmitting and receiving infrared rays provided at an end surface at the one end of the housing; and a signal line extending from the transmission-reception terminal to the other end of the housing.

7. A pipe coupling comprising:
the female coupling member of claim 1; and
a male coupling member configured to be connected to the female coupling member by being inserted from the one end of the female coupling member.

8. A pipe coupling comprising:
the female coupling member of claim 2; and
a male coupling member configured to be connected to the female coupling member by being inserted from the one end of the female coupling member.

9. A pipe coupling comprising:
the female coupling member of claim 3; and
a male coupling member configured to be connected to the female coupling member by being inserted from the one end of the female coupling member.

10. A pipe coupling comprising:
the female coupling member of claim 4; and
a male coupling member configured to be connected to the female coupling member by being inserted from the one end of the female coupling member.

11. A pipe coupling comprising:
the female coupling member of claim 5; and
a male coupling member configured to be connected to the female coupling member by being inserted from the one end of the female coupling member.

12. A pipe coupling comprising:
the female coupling member of claim 6; and
a male coupling member configured to be connected to the female coupling member by being inserted from the one end of the female coupling member.

13. A female coupling member comprising:
a tubular housing having one end for connecting to a male coupling member, and another end for connecting to a fluid supply pipe extending from a fluid source, the tubular housing having a fluid passage for communicating between the male coupling member connected to the one end and the fluid supply pipe when connected to the other end, the housing has a first window for viewing;

a valve member displaceable between an open position where the valve member opens the fluid passage and a closed position where the valve member closes the fluid passage;

a valve open-closed state indicating member having a valve open state indicating part and a valve closed state indicating part, the valve open-closed state indicating member being provided in the housing and displaced in response to displacement of the valve member such that, when the valve member is in the open position, the valve open state indicating part aligns with the first window in a radial direction of the housing, thereby allowing the valve open state indicating part to be viewable through the first window from outside of the housing, while the valve closed state indicating part is covered by the housing and not viewable from the outside of the housing, whereas, when the valve member is in the closed position, the valve closed state indicating part aligns with the first window in the radial direction of the housing, thereby allowing the valve closed state indicating part to be viewable through the first window from the outside of the housing, while the valve open state indicating part is covered by the housing and not viewable from the outside of the housing; and wherein the valve member has a movable valve seat member and a valve element which are provided in the fluid passage so as to be displaceable in a longitudinal direction of the fluid passage, the valve member being configured such that the valve element closes the fluid passage by engaging a valve seat portion of the movable valve seat member, and that the valve element is disengaged from the valve seat portion to open the fluid passage by displacement of the movable valve seat member relative to the valve element;

the valve open-closed state indicating member being configured to be displaced in response to displacement of the movable valve seat member in the longitudinal direction.

14. The female coupling member of claim 13, further comprising:

an arresting member provided at a position closer to the one end of the housing than the valve member in alignment with the valve member in the longitudinal direction of the fluid passage, the arresting member being displaceable in the longitudinal direction of the fluid passage, the arresting member being configured to be displaced toward the valve member to reach an arresting position by the male coupling member inserted into and connected to the female coupling member;

the movable valve seat member and the valve element being configured to be displaced toward the one end of the housing by a fluid pressure of a pressurized fluid supplied through the fluid supply pipe connected to the other end of the housing, so that the arresting member, which is in the arresting position at this time, engages the valve element to stop displacement of the valve element, while allowing the movable valve seat member to be displaced relative to the valve element that has stopped, thereby opening the fluid passage.

15. A pipe coupling comprising:
the female coupling member of claim 13; and
a male coupling member configured to be connected to the female coupling member by being inserted from the one end of the female coupling member.

16. A pipe coupling comprising:
the female coupling member of claim 14; and
a male coupling member configured to be connected to the female coupling member by being inserted from the one end of the female coupling member.

* * * * *